United States Patent [19]
Miki

[11] 3,858,230
[45] Dec. 31, 1974

[54] TRICK PHOTOGRAPHING DEVICE FOR MOTOR DRIVEN MOTION PICTURE CAMERAS

[75] Inventor: Yukio Miki, Osaka, Japan

[73] Assignee: Minolta Camera Kabushiki Kaisha, Osaka-fu, Japan

[22] Filed: Sept. 29, 1972

[21] Appl. No.: 293,569

[30] Foreign Application Priority Data
Oct. 13, 1971 Japan.............................. 46-93709

[52] U.S. Cl. .................................................. 352/91 S
[51] Int. Cl. .......................................... G03b 21/36
[58] Field of Search ...................................... 352/91

[56] References Cited
UNITED STATES PATENTS

| | | | |
|---|---|---|---|
| 3,246,944 | 4/1966 | Winkler | 352/91 S |
| 3,685,891 | 8/1972 | Koeber | 352/91 S |
| 3,690,748 | 9/1972 | Roth | 352/91 S |
| 3,712,720 | 1/1973 | Winkler et al. | 352/91 S |
| 3,761,166 | 9/1973 | Hirata | 352/91 S |
| 3,778,138 | 12/1973 | Iida | 352/91 S |

Primary Examiner—John M. Horan
Assistant Examiner—Russell E. Adams, Jr.
Attorney, Agent, or Firm—Watson, Cole, Grindle & Watson

[57] ABSTRACT

A trick photographing device for motor driven motion picture cameras, having a manually operative dial or knob for switching between a normal photographing operation, an overlapping photographing operation and fading photographing operation. Manipulation of this dial effects control of engagement and disengagement between a film driving gear and a gear train of a time setting member, of an operating member adapted to lock and unlock the rotation of a film winding shaft or drum, of movement of a shutter open angle operating plate, of a switching operation of a film driving motor between forward and reverse directions, and of opening and closing of a switch connected to a reverse rotation circuit. The operating member locks the film winding shaft only against rotation in the overlapping photographing operation, and the switch connected to the reverse rotation circuit is held in an open position in the fading photographing operation of the motion picture camera.

6 Claims, 10 Drawing Figures

TRICK PHOTOGRAPHING DEVICE FOR MOTOR DRIVEN MOTION PICTURE CAMERAS

BACKGROUND OF THE INVENTION

1. Field of the Invention

This invention relates generally to a trick photographing device for motion picture cameras of the motor drive type, and more particularly to a trick photographing device for a motor driven motion picture camera which is capable of switching the operational position thereof between normal photographing, lap dissolving photographing and fading photographing positions by manipulation of a manually operative member.

Motion picture cameras using Super 8 film cartridges, sold by Eastman Kodak Co., have been known to include trick photographing devices capable of lap dissolving and fading photographing operations in addition to carrying out the normal photographing operation.

With the conventional trick photographing devices of such type, when carrying out lap dissolving photographing, the film winding spool or shaft on the film winding side of the cartridge is held in a locked position against rotation at the time of initiating the dissolving or fade-out photographing, so that, the film fed toward the film winding spool by means of a film feeding claw stays in a loose condition in a space within the film winding chamber being wound around the film winding spool.

This is because the Super 8 film cartridge is provided with a claw on the film winding spool for blocking the reverse rotation thereof, and therefore it would become impossible to rewind the film if the same were fed to and wound around the film winding spool by the film winding claw during the dissolving photographing operation.

After completion of the fade-out photographing operation, the film feeding claw is rotated in the reverse direction, so that the film which has been subjected to the fade-out photographing operation and staying in the space of the film winding chamber is fed back into the space of the film supplying chamber to rewind the film by a length identical to the length subjected to the fade-out photographing operation, and then the reverse rotation of the film feeding claw is brought to an end.

In order to start the dissolving photographing operation under these conditions, the film winding spool is released from its locked position and allowed to rotate for overlapping operation.

However, in a system where the film winding spool is held in a locked position in effecting fade-out in the overlapping photographing operation, it is important to synchronize the locking of the winding spool with the operation of the time setting member which is actuated by the initiation of the dissolving photographing operation and which determines the length of the motion picture film in the fade-out photographing operation. This is because, if the film winding spool is locked after actuation of the time setting member, leading portions of the film are wound around the film winding spool and will not be fed back to the film supplying chamber by the time setting member during the reverse rotation.

This also means that the film comes to a stop too soon during the reverse transportation of the film. On the other hand, the reverse driving of the film is effected through a time period determined by the time setting member, so that the film is pulled forcibly in the reverse direction, resulting in breakage of the perforations in the film, overload imposed on the driving motor due to blockage of driving thereof, over-current flowing through the motor and other causes of trouble.

On the contrary, if the locking of the film winding spool or shaft is effected prior to the actuation of the time setting member, an objectionable slackening of the film occurs between the film supplying spool and the film winding spool.

Further, with the conventional trick photographing system of the type mentioned above, the film winding spool is also held in a locked position in the same manner as in the overlapping photographing operation. Therefore, in order to carry out fading photographing in the vicinity of either the fore or rear end of the motion picture film it is difficult to feed or feed back the film into the film winding chamber or the film supplying chamber, since there is almost no space in the film supplying chamber to receive a length of film fed back thereto during the fading operation near the fore end of the film, while there is almost no space in the film winding chamber to loosely receive the film fed thereto during the fading operation near the rear end of the film, due to bulkiness of the film rolled on the supply spool or the winding spool.

In view of the foregoing, the present invention aims at avoiding the above-noted difficulties by accurately synchronizing the actuation of the time setting member with the locking of the winding spool in the overlapping photographic operation while holding the winding spool in a released or unlocked position in the fading photographing operation.

2. Objects of the Invention

An object of the present invention is to provide a trick photographing device for motor driven motion picture cameras, which is capable of switching the normal photographing operation over to overlapping or fading photographing operation in a reliable manner.

Another object of the present invention is to provide a trick photographing device for motor driven motion picture cameras, whereby the film winding spool is locked in position when the camera is switched from normal photographing operation over to overlapping operation, the locking of the film winding spool being synchronized in a secure manner with actuation of a time setting means which determines the length of the film to be subjected to the overlapping photographing operation.

A further object of the present invention is to provide a trick photographing device for motion picture cameras, whereby the film winding spool is held in a released or unlocked position when the camera is switched from normal photographing operation over to fading photographing operation.

These and other objects and features of the present invention will become more apparent from the following detailed detailed description of a preferred embodiment of the invention.

SUMMARY OF THE INVENTION

According to the present invention, in order to attain the objects mentioned hereinbefore, by switching a manually operative member over to an overlapping photographing position, a gear train meshed with a gear on a film driving shaft is brought into engagement with a gear of the time setting member while at the same time an operating member is actuated to lock the film winding spool in position, and the time setting member is brought into engagement with a shutter opening angle operating plate for operating the same and also with a forward-reverse rotation switch of the motor circuit and an on-off switch of the reverse rotation circuit thereof for actuating the motor circuit for effecting forward and reverse transportation of the film by means of a film feeding claw. Furthermore, by changing over the gear train mentioned above, the time setting member is returned to its rest position while effecting the operation of the shutter opening angle operating plate and of the film winding. On the other hand, by switching the manipulating member over to a fading photographing position, the operating member is actuated together with a blocking member which is adapted to release the film winding spool from its locked position, and the gear train is brought into meshing engagement with the gear of the time setting member without stopping the rotation of the film winding spool, the time setting member actuating the shutter opening angle operating plate and the forward-reverse rotation switch of the motor circuit for effecting the fade-out photographing operation, and then changing over the above-mentioned gear train for effecting the fade-in photographing operation.

Figure 8:
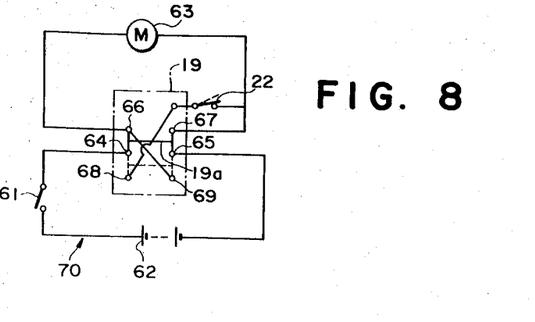
FIG. 8 is a circuit diagram of a motor driving circuit.
Figure 9:
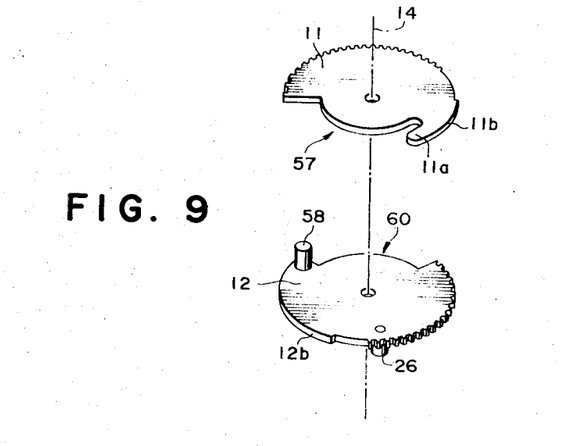
FIG. 9 is a perspective view of a time setting member.

Referring to the accompanying drawings showing a preferred embodiment of the present invention, the worm gear 1, as shown in the upper part of the various figures, is driven from a driving motor 63 as shown in FIG. 8 through a transmission system and a driving shaft 39. This worm gear 1 is held in meshed engagement with a worm gear 2. A worm gear 3 is provided coaxially with worm gear 2, both gears 2 and 3 being rotatably fitted over a shaft 5 securely fixed to and extending through an upper plate member 4.

Figure 10:
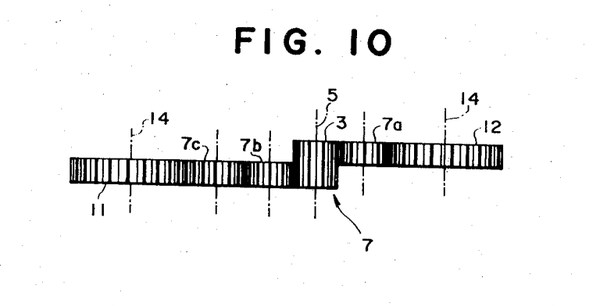
FIG. 10 is a side view schematically showing the relationship between a connecting gear train and the time setting member engaged with each other.

Shaft 5 has fitted thereon a change-over plate 6 for rocking movement therewith. On the reverse side of change-over plate 6, there is provided a gear train 7 consisting of gears 7a and 7b which mesh with the gear 3, and a gear 7c which engages with gear 7b, as shown in FIGS. 2 and 10, each of the gears 7a, 7b and 7c being rotatably supported on a respective shaft.

Figure 2:
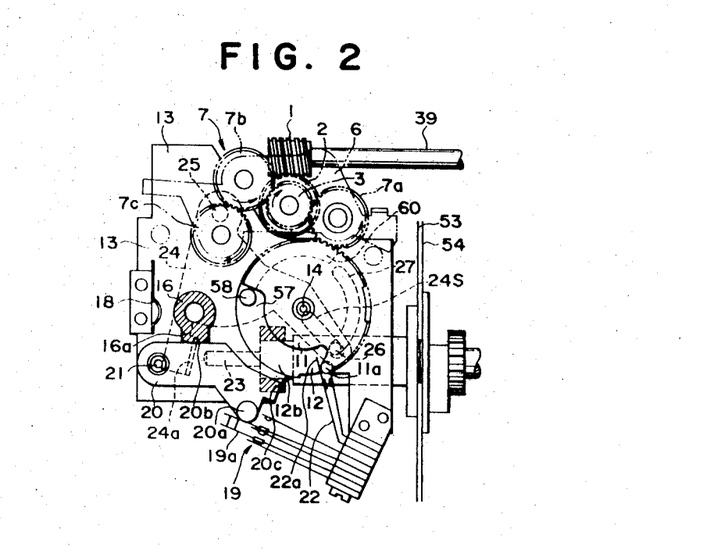
FIG. 2 is a view similar to FIG. 1 but showing the same with the upper plate removed.

Gear 7a is engageable with a notched gear 12, diagrammatically shown in FIG. 2, by rocking movement of the change-over plate 6 while the gear 7c is engageable with a notched gear 11.

Figure 3:
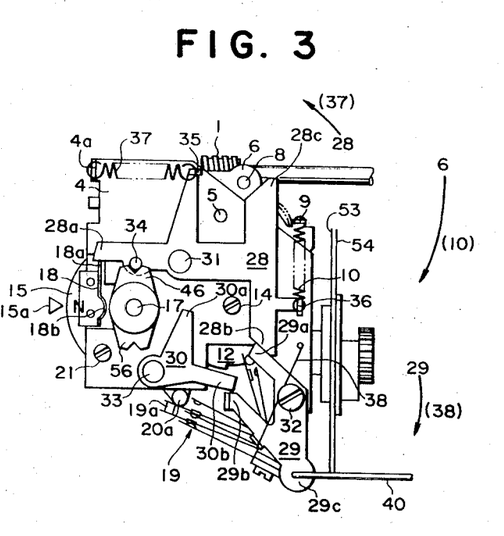
FIG. 3 is a side view showing the arrangement of the various parts as seen from above the side plate of FIG. 1.
Figure 4:
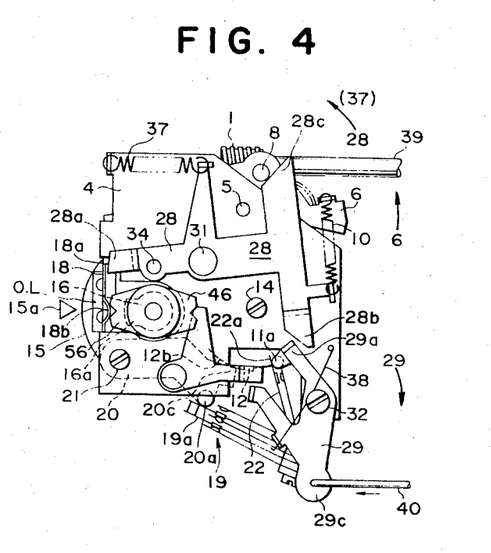
FIG. 4 is a side view showing the arrangement of FIG. 3 as being switched over to the overlapping photographing position for starting the fade-out photographing operation.

On change-over plate 6 there are provided a pin member 8 and a spring retainer 9 only portions of which are shown in the upper part of FIGS. 3 and 4 as extending toward the front side.

Spring retainer 9 is connected by means of a spring 10 to a spring retainer 36 of a T-shaped operating member 28 which will be discussed in detail hereinafter, for biasing the change-over plate 6 to rotate clockwise.

Notched gears 11 and 12, which are shown at the center of FIG. 2, form a time setting means and are provided with spaced teeth portions 11b and 12b, and notched portions 57 and 60, respectively, as seen in this FIG. Notched gears 11 and 12 are rotatably supported on a shaft 14 extending from a lower plate member 13 and threaded into the upper plate member 4 at the upper end thereof. The notched portion 57 provided in notched gear 11 is engageable with a first pin member 58 extending from the front side of notched gear 12. A second pin member 26 extending from the rear side of notched gear 12 is passed through an arcuate slot 27 formed in lower plate member 13 and fitted into a bore 24s of a shutter open angle operating plate member 24 which is provided on the rear side of the lower plate member as will be described in greater detail hereinafter. The projecting end 11a of notched gear 11 is brought into engagement with an on-off contact member 22a of a reverse rotation stop switch 22 during the rotational movement thereof.

Figures 5, 6, 7:
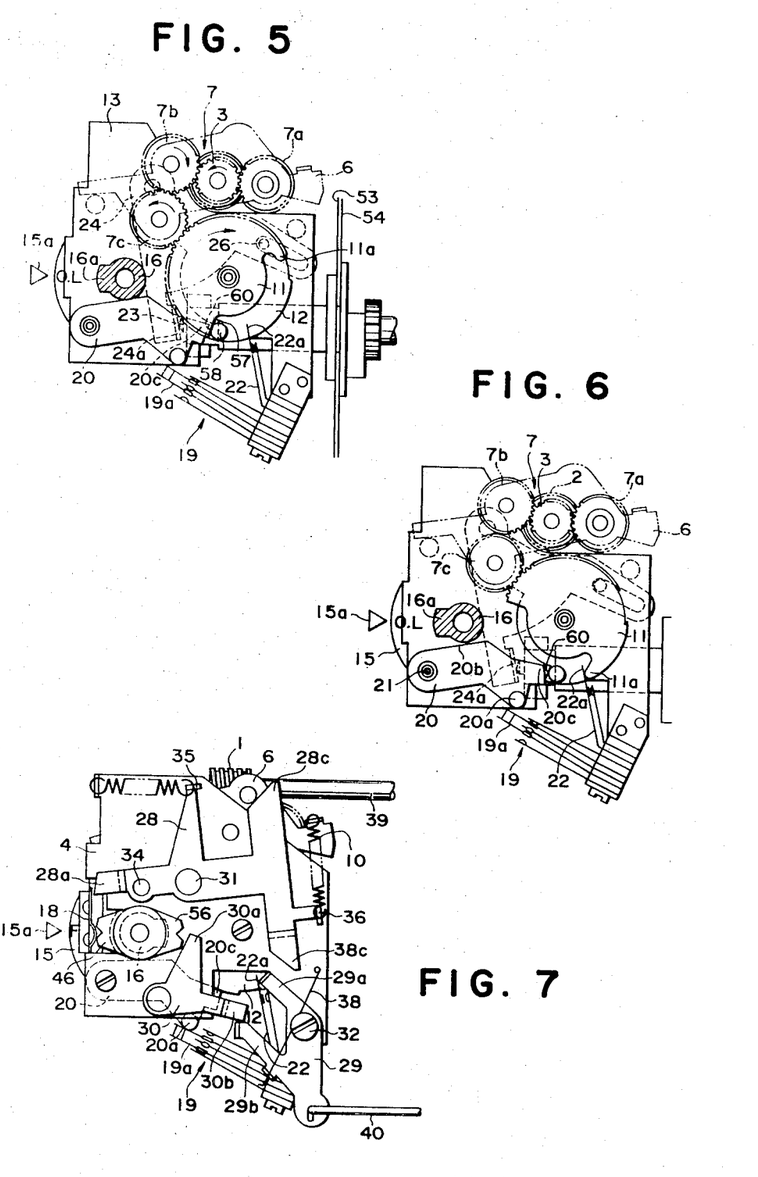
FIG. 5 is a side view showing the arrangement of FIG. 4 in a position where the fade-out is completed and reverse feeding of the film has started, the upper plate being removed.
FIG. 6 is a view similar to FIG. 5 but showing the same in a position where the reverse feeding of the film has been completed and driving has been brought to an end.
FIG. 7 is a side view showing the same arrangement as when the camera has been switched over to the fading photographing position and the fading photographing operation has been started.

The reverse rotation stop switch 22 is inserted into a film driving circuit 70 in the manner as shown in FIG. 8 and, when projecting end 11a of notched gear 11 is engaged with contact member 22a of switch 22 as shown in FIG. 2, switch 22 is open while the same is closed when projecting end 11a of notched gear 11 is disengaged from contact member 22a as shown in FIG. 5.

Though not specifically shown in the drawings, notched gears 11 and 12 are provided with light friction brakes, respectively, in order to prevent spontaneous movement thereof.

Figure 1:
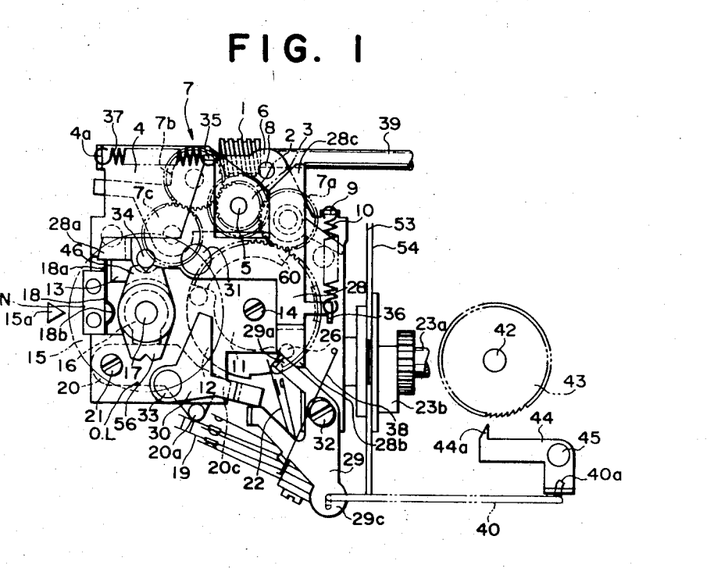
FIG. 1 is a side view showing the arrangement of various parts of an embodiment of the present invention in a normal photographing position.

As shown on the lefthand of FIGS. 1 and 3, there are rotatably mounted on a cam shaft 17 a manually operative selector dial or knob 15, a cam member 16 securely fixed to the selector dial for rotation therewith, and restricting or blocking projections 46 and 56 formed integrally with cam member 16. Shaft 17 is securely supported on lower plate member 13.

With rotational movements of selector dial 15, projecting portion 16a of cam member 16 is engaged with and disengaged from a change-over lever 20 as seen in FIGS. 2 and 5. Blocking or restricting projection 46 is disengageably engageable with a pin member 34 provided on operating member 28, as seen in FIG. 3, while restricting projection 56 is disengageably engageable with one arm 30a of an L-shaped or two-armed blocking member 30. At the fore ends of both the restricting projections 46 and 56 are provided an indented portion which is engageable with a projecting portion 18b of a click plate member 18 secured to lower plate member 13.

The manually operative selector dial 15 has on the upper face thereof reference marks such as N representing normal photographing, 0.L representing overlapping photographing and F representing fading photographing, the marks 0.L and F being provided in a position 90° and 180° displaced respectively to mark N. The selector dial 15 may be rotated manually to bring the reference marks N, 0.L and F into registry with an index mark 15a.

In the lower part of FIG. 2, there is shown a forwardreverse rotation switch 19, the switching operation of which is effected by a projecting portion 20a provided at the lower end of change-over lever 20. The change-over lever 20 is rotatably mounted on a shaft 21 securely fixed to the lower plate member 13 and is provided with an upper edge portion 20b which is engageable with projecting portion 16a of cam member 16, and a righthand upper end portion 20c which is engageable with the outer periphery of notched gear 12. Change-over lever 20 is biased to rotate counterclockwise by means of a spring action of contact member 19a.

The forward-reverse rotation switch 19 is adapted to effect switching for the film driving circuit 70 and, as shown in FIG. 2, movable contact member 19a is compressed by projecting portion 20a at the lower end of change-over lever 20, the arrangement being made such that the forward rotation circuit is completed when the projecting portion 20a of change-over lever 20 is in the lower position of FIG. 2, while the reverse rotation circuit is completed when lever 20 is in the upper position as shown in FIG. 5. In other words, when movable contact 19a is in the upper position shown in FIG. 8, terminals 64 and 66 and terminals 65 and 67 are connected, respectively, by movable contact member 19a to complete the forward rotation circuit of the motor. On the other hand, when movable contact member 19a is in the lower position, terminals 64 and 68 and terminals 65 and 67 are connected, respectively, to complete the reverse rotation circuit of the motor. Reference numeral 61 identifies a power switch which is opened and closed in relation with the shutter releasing operation, 62 identifies a power source battery, and 22 is the reverse rotation stop switch inserted into the motor reversing circuit.

As shown in FIG. 2, a shutter opening angle operating plate member 24 is provided on the inner side of lower plate member 13 for rocking movement on a shaft 25 which is secured to lower plate member 13.

The shutter opening angle operating mechanism is of the known construction wherein the shutter blade variable shaft 23 is slid under pressure imposed thereon by the lower end edge 24a of shutter opening angle operating plate member 24. If shutter blade variable shaft 23 is moved rightward, as seen in the drawings, the shutter open angle is narrowed until it is finally completely closed, and if shutter blade variable shaft 23 is moved leftward, the shutter open angle is widened until the initial full open width is attained. Shutter shaft 23a is provided with a member 23b for driving a film feeding claw.

Upper and lower plate members 4 and 13 are supported and held in parallel relationship with each other by means of shaft 14 of notched gears 11 and 12, and also by means of shaft 21 of change-over lever 20.

In front of upper plate member 4, a T-shaped operating member 28 is supported on a shaft 31 as shown in FIG. 3 for rotational movement thereabout. Provided below and rightwardly of operating member 28 is a V-shaped lever for rotation about a shaft 32 and for engagement with a blocking member 30 which is rotatably supported on a shaft 33. This blocking member 30 engages with restricting projections 46 and 56 which are rotatably supported on shaft 17.

As shown in FIGS. 3 and 4, there are provided on the T-shaped operating member 28 a pin member 34 projecting toward the front side, an upper spring retainer 35 and a lower spring retainer 36. The spring retainer 35 is connected to the spring retainer 4a of the upper plate member 4 by means of a spring 37, while the lower spring retainer 36 is connected to a spring retainer 9 on the change-over plate 6 by means of spring 10, in order to bias operating member 28 to rotate in a counter-clockwise direction and also to bias change-over plate 6 to rotate in a clockwise direction. Furthermore, pin member 34 is engageable with restricting projection 46 mentioned hereinbefore.

V-shaped lever 29 serves to stop the rotation of the film winding shaft or spool 42. Spring member 38 which is wound around shaft 32 has one end thereof extended to lever 29 and the other end secured to upper plate member 4 in order to impart clockwise rotation to lever 29.

Right arm 29a of V-shaped lever 29 is engageable with the lower end 28b of operating member 28 mentioned hereinbefore while left arm 29b is engaged with one arm 30b of the L-shaped blocking member 30. Attached to the lower end portion 29c of V-shaped lever 29 is a connecting rod member 40 the righthand end of which has connected thereto a stopping member which is engageable with a gear 43 securely mounted on film winding shaft 42 for holding the latter in a stopped position. A stopping member 44 is rotatably mounted on a shaft 45.

Normal Photographing Operation

With the construction of the present invention as described hereinabove, in order to carry out the normal photographing operation N, the shutter is released with selector dial or knob 15 in the N position.

This is because, if selector knob 15 is held in the N position, change-over lever 20 is pressed downwardly by projecting portion 16a of cam member 16 as shown in FIG. 1, so that contact member 19a of forward-reverse rotation switch 19 is held in the lower position to place motor circuit 10 for forward rotation.

Restricting projection 46 formed integrally with cam member 16 is engaged with pin member 34 of operating member 28 holding the same in the position as shown in FIG. 1.

The lefthand tip end portion 28a of operating member 28 is abutted against upper end portion 18a of click plate 18. The lower end of operating member 28 is engaged with right arm 29a of V-shaped lever 29, restricting lever 29 to the position of FIG. 1.

Therefore, stopping member 44 connected by connecting rod member 40 is held in the position of FIG.

1 without stopping gear 43 and thus without locking film winding shaft 42. Furthermore, in this position, upper end 28c of operating member 28 is disengaged from pin member 8 on change-over plate 6.

Change-over plate 6 is held in the position of FIG. 1 by the action of spring 10 and gear 7a on the righthand end of change-over plate 6 is held in a position meshed with notched gear 12.

However, gear 7a is facing notched portion 60 of notched gear 12 so that gear 12 remains stopped even if gear 7a is rotated. On the other hand, notched gear 11 is held in a position disengaged from gear 7a as shown in FIG. 8 and thus remains likewise stopped. Therefore, shutter open angle operating plate 24 shown in phantom in FIG. 2 remains stopped in the position shown in the same Figure and lower end face 24a of shutter open angle operating plate 24 is held in a position disengaged and retracted from shutter blade variable shaft 23, with shutter blades 53 and 54 in a relative position for normal photographing operation.

Under these conditions, if the shutter is released, gear 7a is idled through worm 1, worm gear 2 and gear 3, so that the normal photographing operation is carried out without actuating the shutter open angle changing mechanism.

Lap Dissolving Photographing

In order to carry out lap dissolving photographing operation, the selector dial 15 is rotated through 45° from the position of FIG. 1 or of FIG. 3. By this rotation of selector dial 15:

1. The restricting projection 46 integrally formed with cam member 16 is disengaged from pin member 34 of operating member 28. Operating member 28 tends to rotate in a counterclockwise direction under the action of spring 37 but is held in the position shown in FIG. 1 since fore end 28a of operating member 28 is abutted against fore end 18 of click plate 18.

2. On the other hand, change-over lever 20 is disengaged from projecting portion 16a of cam member 16. Further, change-over lever 20 is rotated in a counterclockwise direction by the spring action of movable contact member 19a of forward-reverse rotation switch 19 until the righthand upper end 20c if change-over lever 20 comes into contact with notched portion 12b of notched gear 12. Under this condition, however, forward-reverse rotation switch 19 is still in a position for forward rotation, as shown in FIG. 4, with movable contact member 19a being held in the lower position by change-over lever 20.

Then, if selector dial 15 is further rotated in a clockwise direction through 45° to bring reference marking 0.L of selector dial 15 into registry with index mark 15a, restricting projection 56 formed integrally with cam member 16 comes into engagement with projecting portion 18a of click plate 18, pushing click plate 18 leftwardly. Consequently, fore end 18a of click plate 18 is disengaged from fore end 28a of operating member 28, allowing the same to rotate abruptly in a counterclockwise direction.

The operations subsequent to the foregoing are:

3. The lower end 28b of operating member 28 is disengaged from right arm 29a of V-shaped lever 29 and which lever 29 is rotated in a clockwise direction, moving connecting rod 40 of FIG. 1 leftwardly. Connecting rod 40 rotates stopping member 44 in a clockwise direction and claw 44a of stopping member 44 comes into meshed engagement with gear 43 of the film winding shaft to thereby stop rotation thereof.

4. Upper end 28c of operating member 28 is abutted against pin member 8 on change-over plate 6 to rotate plate 6 in a counterclockwise direction.

Therefore, the leftmost gear 7c provided on change-over plate 6, though not appearing in FIG. 4, comes into engagement with notched gear 11 so that the rotation of gear 7c imparts a counterclockwise rotation to notched gear 11. Further, since notched portion 57 of gear 11 is engaged with a pin member 58 projecting through the other notched gear 12, notched gear 12 is rotated in a counterclockwise direction together with notched gear 11.

As second pin member 26 projecting rearwardly from the notched gear 12 is fitted into bore 24s of shutter open angle operating plate member 24, this plate member 24 is also rotated in the counter-clockwise direction together with notched gear 12.

It should be understood that the above-described operations are carried out almost at the same time and instantaneously.

Then fore end 24a of shutter open angle operating plate 24 is abutted against shutter variable shaft 23 to slide shutter variable shaft 23 rightwardly against action of a spring not shown in the drawings, thus narrowing the open angle of the shutter for carrying out the fade-out photographing operation.

Meanwhile, righthand digital end 11a of notched gear 11 is disengaged from the contact member of reverse rotation stop switch 2 for closing this switch.

With notched gears 11 and 12 further rotated in a counterclockwise direction, righthand upper end 20c of change-over lever 20 is fitted into notched portion 60 of notched gear 12 and projecting portion 20a is retracted from movable contact member 19a, so that the forward-reverse rotation switch is placed in a position for reverse rotation. Then, lower end face 24a of shutter blade open angle operating plate 24 shifts the shutter blade variable shaft to the rightmost position thereof to completely close shutter blades 53 and 54.

FIG. 5 shows a condition wherein the above-described operations have been carried out and the driving motor has just initiated rotation in the reverse direction upon completion of the dissolving photographing operation.

When the reverse transportation of the film is started by the reverse rotation of the motor, notched gear 11 is rotated in a clockwise direction by means of gear 7c. At this time, notched gear 12 remains stationary since the same is not engaged with gear 7c and fore end 20c of change-over lever 20 is fitted in notched portion 60 of gear 12. Therefore, shutter open angle operating plate member 24 also remains in a stopped state with shutter blades 53 and 54 held in closed condition.

With notched gear 11 further rotated in a clockwise direction, digital end 11a of gear 11 pushes contact member 22a of reverse rotation stop switch 22 to open the same for stopping the drive by the reverse rotation circuit of the motor, thus completing the rewinding of the film.

FIG. 6 shows a condition wherein the drive for reverse transportation of the film or the reverse rotation has been stopped.

In such condition, if selector dial 15 is rotated to bring reference marking N into registry again with index mark 15a, cam member 16 pushes change-over lever 20 to disengage the same from notched portion 60 of notched gear 12, projecting portion 20a of change-over lever 20 pushing movable contact member 19a to place forward-reverse rotation switch 19 in the position for forward rotation.

On the other hand, restricting projection 46 integral with cam member 16 pushes pin member 34 upwardly to rotate operating member 28 clockwise against the action of spring 37 into the position of FIG. 1. Pin member 8 on change-over plate 6 is disengaged from the upper end of operating member 28 and change-over plate 6 is allowed to rotate in a clockwise direction, bringing gear 7a into a meshed engagement with notched gear 12.

Right arm 29a of V-shaped lever 29 is then engaged with lower end 28b of operating member 28 and rotated in a counterclockwise direction, pushing connecting rod 40 in a rightward direction. Connecting rod 40 causes stopping member 44 to rotate counterclockwise for releasing gear 43 from its locked position.

If the shutter is released under these conditions, gear 12 is rotated in a clockwise direction by gear 7a. Therefore, shutter open angle operating plate 24 in engagement with second pin member 26 on gear 12 is also rotated in a clockwise direction. Thus, shutter blade variable shaft 23 engaging with lower end face 24a of shutter open angle operating plate 24 is caused to slide in a leftward direction by means of a spring, which is not shown in the drawings, to gradually open shutter blades 53 and 54 to effect the fade-in photographing operation.

If the fade-in is finished by further rotation of notched gear 12, gear 7a is disengaged from notched portion 60 of notched gear 12 and is allowed to idle. Notched gear 12 is stopped in the position where it is disengaged, allowing to continue normal photographing operation thereafter.

Fading Photographing Operation

In order to carry out the fading photographing operation, selector dial 15 is rotated in a counterclockwise direction as shown in FIG. 7, registering reference marking F of the dial with index mark 15a.

Restricting projection 56 integral with cam member 16 comes into engagement with one arm 30a of L-shaped blocking member 30 to rotate the same into the position shown in FIG. 7. The other arm 30b of blocking member 30, therefore, comes into engagement with the left arm 29b of V-shaped lever 29 and stops lever 29 in the position as shown.

Under these conditions, right arm 29a of V-shaped lever 29 is engaged with reverse rotation stop switch 22 to retain the same in an open condition.

Since connecting rod 40 is pushed to the rightward position by V-shaped lever 29, film winding shaft 42 is not in a locked or stopped condition.

Further, operating member 28, change-over lever 20 and changeover plate 6 operate in the same manner as in the overlapping photographing operation as described above, and gear 7c is held in meshed engagement with notched gear 11.

If the shutter is released under these conditions, both notched gears 11 and 12 are rotated in a counterclockwise direction for effecting the fade-out photographing operation.

When the fade-out is finished by further rotation, the change-over lever fits in notched portion 60 of notched gear 12 to place the forward-reverse rotation switch in the position for reverse rotation.

However, reverse rotation stop switch 22 is left in the opened condition by V-shaped lever 29, so that driving motor 63 comes to a stop without rotating in the reverse direction.

Thus, the fade-out opertion is completed.

If selector dial 15 is rotated and returned to the N position and the shutter is released under these conditions, gear 7a is meshed with notched gear 12, so tht it becomes possible to carry out the fade-in in the same manner as in the fade-in operation described with reference to the OVER-LAPPING PHOTOGRAPHING OPERATION, above.

Likewise, it is possible to continue the normal photographing operation after the fade-in operation in the same manner as described above and hence no further explanation thereof is given herein for simplicity of explanation.

It will be appreciated from the foregoing that, according to the present invention, simply by changing the manually operative dial over to the O.L position, the film winding shaft is instantaneously held in a stop position and at the same time, the time setting members are actuated, so that it is possible to prevent a portion of the film advanced into the film winding chamber during the fade-out operation from being wound around the film winding shaft and failing to be returned to the film supplying chamber at the time of reverse rotation.

Further, in the fading photographing operation, even if selector dial 15 is switched over to the F position, the reverse rotation stop switch is held in an opened condition and the film winding shaft is not locked in the stop position, so that it is made possible to carry out the fading operation in the vicinity of the ends of the film.

What is claimed is:

1. A trick photographing device for a motor driven motion picture camera comprising:
   a reversible electric motor;
   a motor circuit including a battery power source for applying a voltage fed in different polarities therefrom, the motor circuit further including a change-over switch having a first position for applying the voltage of one polarity to the motor and transporting a film in a forward direction, and a second position for applying the voltage of the other polarity to the motor and transporting the film in a reverse direction;
   an on-off switch openable for interrupting the voltage supply through said change-over switch of said second position;
   a time setting means having a first notched gear rotatably mounted on a shaft and comprising a toothed portion and an arcuate spaced portion formed by a notched portion for opening said on-off switch, a second notched gear rotatably supported on said shaft, and a connecting member for transmitting rotation in one direction of said first notched gear to said second notched gear;
   a shutter open angle operating member rotatable in association with the rotation of the second notched gear;
   a clutch member having first and second associated gears driven from said motor and rotatable in opposite directions and movable between a first position where the first associated gear is engageable with said first notched gear, and a second position where the second associated gear is engageable with said second notched gear;

a first member for releasing a film winding shaft from a stop position and movable between a first position for locking said on-off switch in an open condition and a second position for releasing the on-off switch from the locked open condition and stopping the film winding shaft;

a manually operable member for switching the camera between a normal photographing position, an overlapping photographing position and a fading photographing position;

a second member held in a position retracted from said second notched gear and adapted to place said change-over switch in said first position when said manually operable member is in said normal photographing position, the second member engaging with said second notched gear for stopping the notched portion thereof and switching said change-over switch from said first position over to said second position when the manually operable member is held in said overlapping photographing position or fading photographing position;

a third member for holding said member in the first position thereof when said manually operable member is in the fading photographing position and for releasing said first member from the first position when the manually operable member is in the normal photographing position or the overlapping photographing position;

a fourth member movable between a first position for holding the first member in the first position thereof and actuating said clutch member for rendering the second associated gear engageable with said second notched gear when said manually operable member is in the normal photographing position, and a second position for releasing said first member from said first position thereof and actuating said clutch member for rendering said first associated gear engageable with said first notched gear when said manually operable member is in the overlapping photographing position or fading photographing position;

a stop member movable between a first position for holding said fourth member in its first position and a second position for releasing said fourth member from being held in its first position and permitting it to move to its second position; and changing means, secured to said manually operable member, for moving said stop member from its first position to its second position when said manually operable member is in its overlapping and fading photographing positions.

2. A trick photographing device for a motor driven motion picture camera as set forth in claim 1, wherein when said change-over switch is in the first position thereof and the clutch member is in the second position thereof, the second associated gear faces and engages with the toothed portion of the second notched gear for transmitting the rotation of the motor thereto to cause the shutter open angle operating member to operate to open the shutter for fade-in photographing operation; when the engagement between the second associated gear and the second notched gear is broken by the notched portion of the second notched gear, the second notched gear holds the shutter open angle operating member in a position maintaining the shutter in an opened state for normal photographing operation; and when the clutch member is in the first position thereof and the first associated gear faces and engages with the toothed portion of the first notched gear, the rotation of the motor is transmitted to the first notched gear for driving the second notched gear by way of said connecting member to operate the shutter open angle operating member to close the shutter for carrying out fade-out photographing operation.

3. A trick photographing device for a motor driven motion picture camera as set forth in claim 1, wherein said first member has two arms, one of which is rotatably supported on a stationary member of the camera and disengageable with said fourth member and a movable contact member of said on-off switch, while the other arm of the first member is disengagable with said third member, the connecting portions between said two arms being connected to a stopping member engageable with and retractable from said film winding shaft, said first member being held in said first position thereof when said fourth member is in the first position thereof and engaged with the first arm or when the second arm is blocked by said third member.

4. A trick photographing device for a motor driven motion picture camera as set forth in claim 1, further comprising a cam member secured to said manually operable member and engaged with said second member for retracting the second member from said second notched gear and placing said change-over switch in the first position thereof when the manually operable member is in the normal photographing position, the cam member engaging with the second notched gear for stopping the notched portion thereof and switching the changeover switch to the second position thereof when said manually operable member is in the overlapping photographing position or the fading photographing position; and wherein said changing means includes a first restricting member, a second restricting member and engaging means, where said first restricting member is secured to said manually operable member and is engageable with said third member to cause the third member to hold the first member in the first position thereof when the manually operable member is in the fading photographing position, the third member releasing the first member when the manually operable member is in the normal photographing position or the overlapping photographing position, said second restricting member is secureed to said manually operable member and is engageable with said fourth member for restricting the fourth member to the first position thereof when the manually operable member is in the normal photographing position, and releasing the fourth member from the restricted position when the manually operable member is in the overlapping or fading photographing position, said stop member is a click stop member provided on a stationary member of the camera for holding said second restricting member in an overlapping photographing position and a fading photographing position, respectively, and said engaging means causes the forth member to be engaged with said click stop member, said means disengaging the fourth member from said click stop member and moving the fourth member from the first position to the second position thereof when said second restricting member is stopped by said click stop member when said manually operable member is in the overlapping and in a fading photographing position.

5. A trick photographing devices defined in claim 1 wherein said manually operable member further includes a first change-over member for operating said second member and a second changeover member for operating said third member.

6. A trick photographing device as defined in claim 1 wherein said stop member includes a plate spring having one of its ends secured in a fixed position and its other end engaged with an end portion of the fourth member.

* * * * *